US012542485B2

(12) United States Patent
Acquas et al.

(10) Patent No.: US 12,542,485 B2
(45) Date of Patent: Feb. 3, 2026

(54) BANDWIDTH CONTROL IN PLL-BASED POWER CONVERTER

(71) Applicant: Apple Inc., Cupertino, CA (US)

(72) Inventors: Andrea Acquas, Munich (DE); Angelo Bassi, Munich (DE); Federico Rossini, Munich (DE); Nicola Rasera, Munich (DE)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 17/934,398

(22) Filed: Sep. 22, 2022

(65) Prior Publication Data

US 2024/0106328 A1 Mar. 28, 2024

(51) Int. Cl.
*H02M 3/158* (2006.01)
*H02M 1/00* (2007.01)

(52) U.S. Cl.
CPC ......... *H02M 3/158* (2013.01); *H02M 1/0009* (2021.05); *H02M 1/0012* (2021.05)

(58) Field of Classification Search
CPC .. H02M 3/158; H02M 1/0009; H02M 1/0025; H02M 1/003; H02M 1/08; H02M 1/0012; H02M 3/156
See application file for complete search history.

(56) References Cited

U.S. PATENT DOCUMENTS 4,929,882 A * 5/1990 Szepesi ................. H02M 3/156 323/222
6,157,180 A 12/2000 Kuo
6,515,880 B1 * 2/2003 Evans ..................... H02M 1/36 363/49
7,834,608 B2 11/2010 Cheng et al.
8,008,902 B2 8/2011 Melanson et al.
9,742,380 B1 * 8/2017 Raj .......................... H03K 7/08
10,250,141 B2 4/2019 Zhang
11,264,913 B2 * 3/2022 Skinner ............... H02M 1/4241
11,757,346 B2 * 9/2023 Ricci ..................... H02M 3/158 323/282
2008/0067993 A1 * 3/2008 Coleman ............... H02M 3/156 323/282

(Continued)

FOREIGN PATENT DOCUMENTS

GB 2578007 A * 4/2020 ............. G05F 1/461

*Primary Examiner* — Gustavo A Rosario-Benitez
(74) *Attorney, Agent, or Firm* — Kowert, Hood, Munyon, Rankin & Goetzel, P.C.; Dean M. Munyon

(57) ABSTRACT

A phase-locked loop (PLL)-based power converter is disclosed. A power converter includes a switch circuit having a switch node coupled to a regulated power supply node via an inductor and configured to source a supply current to the regulated power supply node using one or more control signals. A control circuit performs a phase-frequency comparison of a reference clock signal and a switching frequency of the switch circuit and generate a control voltage using results of the phase-frequency comparison. The control circuit further generates a control current using the control voltage, a voltage of the regulated power supply node, and a duty cycle of the switch circuit, and a demand current using the voltage level of the regulated power supply node and a reference voltage. Using the demand current, the control current, and a sensed version of the supply current, the control circuit generates the one or more control signals.

18 Claims, 9 Drawing Sheets

(56) References Cited

U.S. PATENT DOCUMENTS

2012/0112721 A1* 5/2012 Wu ..................... H02M 3/156
323/288
2015/0277460 A1* 10/2015 Liu ..................... G05F 1/56
323/280
2015/0280557 A1* 10/2015 Xue ..................... H02M 3/156
323/271
2016/0006336 A1* 1/2016 Bennett ..................... H02M 3/156
323/271
2018/0083532 A1* 3/2018 Gozzini ..................... H02M 1/08
2019/0089244 A1* 3/2019 Koski ..................... H02M 3/07
2020/0212800 A1* 7/2020 Fan ..................... H02M 3/158
2021/0175800 A1* 6/2021 Lee ..................... H03L 7/093
2022/0181974 A1* 6/2022 Liu ..................... H02M 3/155
2022/0239228 A1* 7/2022 Fukushima ......... H02M 3/1588

* cited by examiner

BANDWIDTH CONTROL IN PLL-BASED POWER CONVERTER

BACKGROUND

Technical Field

This disclosure is directed to electronic circuits, and more particularly, to power converters.

Description of the Related Art

Computing systems may include one or more systems-on-a-chip (SoC), each of which may integrate a number of different functions onto a single integrated circuit. Various SoCs and/or various functional blocks on a given SoC may utilize power signals of different voltage levels. Since computing systems may include a single power source with a given output voltage level, one or more voltage converters or voltage regulators may be used to generate the power signals of different voltage levels.

Voltage regulation circuits implemented in a given computing system may be designed according to one of various design styles and types. Types of circuits for converting a DC power signal with a first voltage to a DC power signal with a second voltage include linear regulators and switching regulators. Buck converters, sometimes also referred to as buck regulators, are one example of a switching regulator.

Switching converters typically include inductors through which current pulses are sourced. The inductor current is sometimes measured in order to implement a current-control loop or a peak current limit. One method for measuring the inductor current is direct current resistance (DCR) sensing, which exploits the non-zero series resistance of the inductor to create a voltage proportional to the inductor current. Another method is to measure a voltage drop on the switching devices.

SUMMARY

A phase-locked loop (PLL)-based power converter is disclosed. In one embodiment, a power converter includes a switch circuit having a switch node coupled to a regulated power supply node via an inductor, wherein the switch circuit is configured to source a supply current to the regulated power supply node using one or more control signals. The power converter also includes a control circuit configured to perform a phase-frequency comparison of a reference clock signal and a switching frequency of the switch circuit and generate a control voltage using results of the phase-frequency comparison. The control circuit is further configured to generate a control current using the control voltage, a voltage level of the regulated power supply node, and a duty cycle of the switch circuit and generate a demand current using the voltage level of the regulated power supply node and a reference voltage. Using the demand current, the control current, and a sensed version of the supply current, the control circuit generates the one or more control signals.

In one embodiment, a charge pump is configured to generate the control voltage based on up and down signals provided by a phase-frequency comparator that performs the phase frequency comparison. The charge pump also includes a compensation circuit configured to generate a charge pump current. In generating the charge pump current, the compensation circuit is configured to generate a sampling voltage across a first capacitor based on the voltage level of the regulated supply voltage node during a first portion of a switching cycle. In a second portion of the switching cycle, subsequent to the first, the compensation circuit transfers the sampling voltage to a second capacitor. The sampling voltage is provided to a transconductance amplifier to generate the charge pump current. By using the compensation circuit, a transfer function of the control circuit is made independent of a variation in the voltage level of the regulated power supply node, as well as independent of a variation of the input voltage.

BRIEF DESCRIPTION OF THE DRAWINGS

The following detailed description makes reference to the accompanying drawings, which are now briefly described.

DETAILED DESCRIPTION OF EMBODIMENTS

Figure 1:
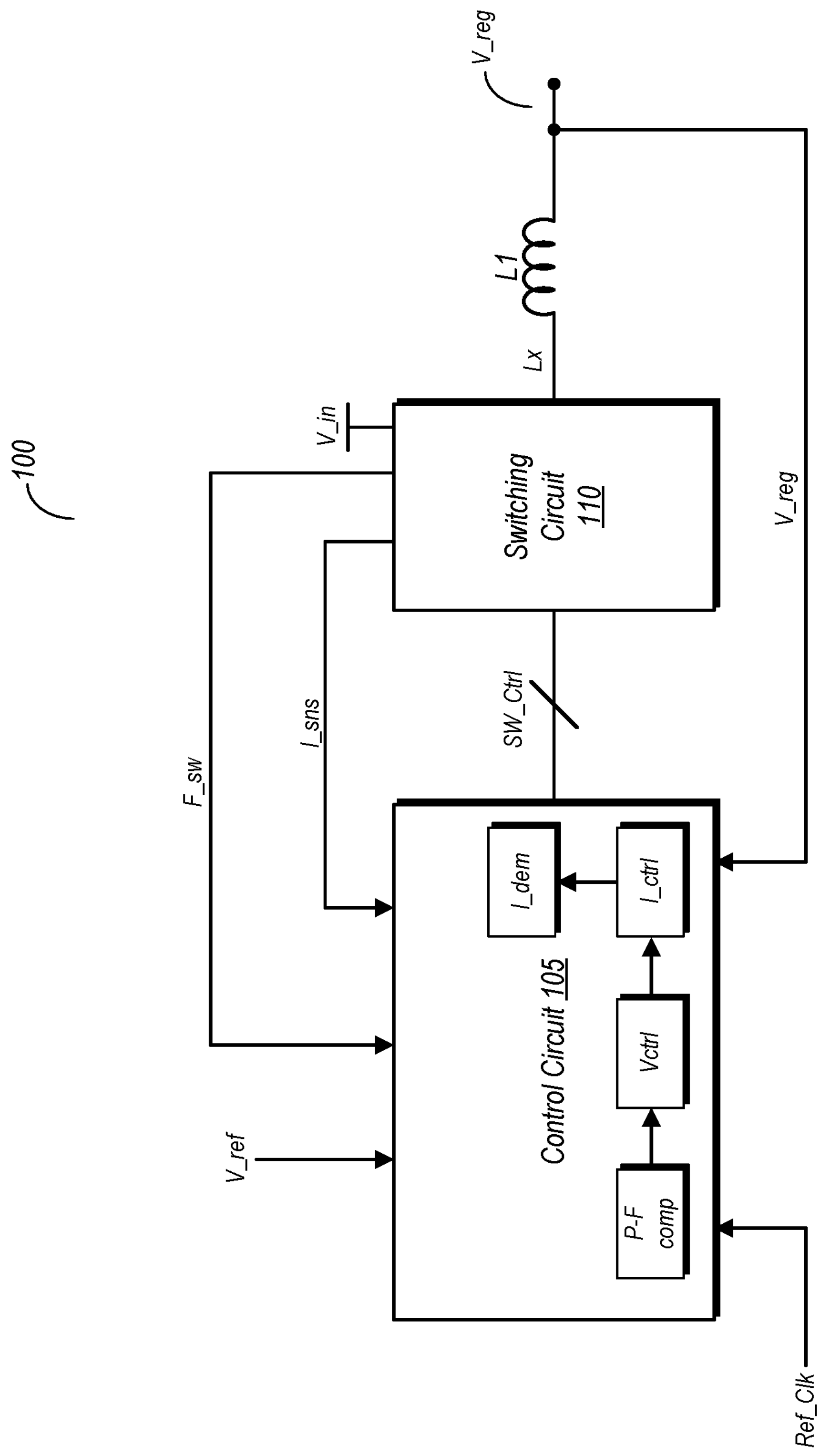
FIG. 1 is a block diagram of one embodiment of a power converter.

The present disclosure is directed to bandwidth-controlled power converter. The operating frequency of a switching power converter, such as a hysteretic buck converter can vary with input and output voltages. In operating a hysteretic buck converter (which is effectively a PLL with the switching circuit acting as a VCO), it is desirable to minimize the locking time to be as small as possible, which translates into higher bandwidth. However, this is difficult to achieve if the VCO (and more particularly, the gain of the VCO, which is a ratio of the change in the switching frequency to a change in the input voltage) varies over Vout and Vin.

The present disclosure makes use of the insight that, if the transfer function of the PLL could be made independent of input and/or output voltage variation, the locking time can be minimized and desired bandwidth can be achieved. Accordingly, the present disclosure contemplates a PLL-based buck converter that operates with a transfer function that is independent of variations in the input and output voltages. In various embodiments, the power converter includes a phase-frequency detector that performs a phase/frequency comparison of a switching frequency (by a switching circuit of the converter) to a reference clock signal. A charge pump generates a control voltage based on the results of the frequency of the comparison, which is subsequently converted into a control current. The control current, along with a demand current, is used to generate control signals that control the switching of high side and low side switches in the switching circuit. The switching circuit sources current to an inductor, at a switching node, with a regulated supply voltage being produced on the other side of the inductor.

In various embodiments, the charge pump includes a compensation circuit that effectively compensates for variations in the output voltage (and thus the input voltage) to effectively make the PLL transfer function independent of these values. The circuit provides a current output which either sources or sinks current from a charge pump. A sampling capacitor is charged on a switching cycle-by-cycle basis. The voltage across the sampling capacitor is sampled during a first portion of each switching cycle, and stored on storage capacitor during a second portion of the switching cycle. The sampled voltage is then converted into a current by a transconductance amplifier and provided to the high side and low side portions of the charge pump to source or sink current, depending on whether the charge pump has received an up or down signal.

Accordingly, the dependence of the PLL transfer function on the output and input voltages may be reduced or effectively eliminated. This may in turn result in increased PLL bandwidth with minimal impact on stability over variations in the input and output voltages (the output voltage being the regulated supply voltage generated by the power converter).

The present disclosure begins with a discussion of embodiments of a PLL-based power converter. Thereafter, a compensation circuit used in association with a charge pump is discussed. A switching control circuit and corresponding switching circuit are described, followed by a brief description of an integrated circuit having an embodiment of the power converter implemented thereon. A description of various methods for operating a power converter follows. The disclosure concludes with the discussion of an example system in which the power converter may be implemented.

Power Converter Embodiments

FIG. 1 is a block diagram of one embodiment of a power converter. In the embodiment shown, power converter 100 includes a control circuit 105 and a switching circuit 110. The switching circuit 110 includes a switch node Lx coupled to a regulated power supply node, V_reg, via inductor L1. The switch circuit 110 is configured to source a supply current using a number of control signals, Sw_Ctrl, which are generated by control circuit 105. Thus, using an input voltage, V_in, switching circuit 110 generates a regulated power supply voltage on the node V_reg.

Control circuit 105 is configured to carry out various functions to generate the control signals. Among the functions performed by control circuit are performing a phase/frequency comparison of a reference clock, Ref_Clk, and a switching frequency, F_sw, of the switching circuit. Based on the results of the phase-frequency comparison, a control voltage, V_ctrl is generated. This control voltage is then converted into an control current, I_Ctrl. The generation of the control voltage and control current are performed using the output voltage on the regulated supply voltage node and a duty cycle of the switching circuit. A demand current, indicative of an amount of current demanded by a load circuit coupled to power converter 100, is generated based on the voltage level on the regulated supply voltage node and a reference voltage. Using the demand current and the control current, the switching control signals, SW_control are generated to control the switching operation of switching circuit 110.

Figure 2:
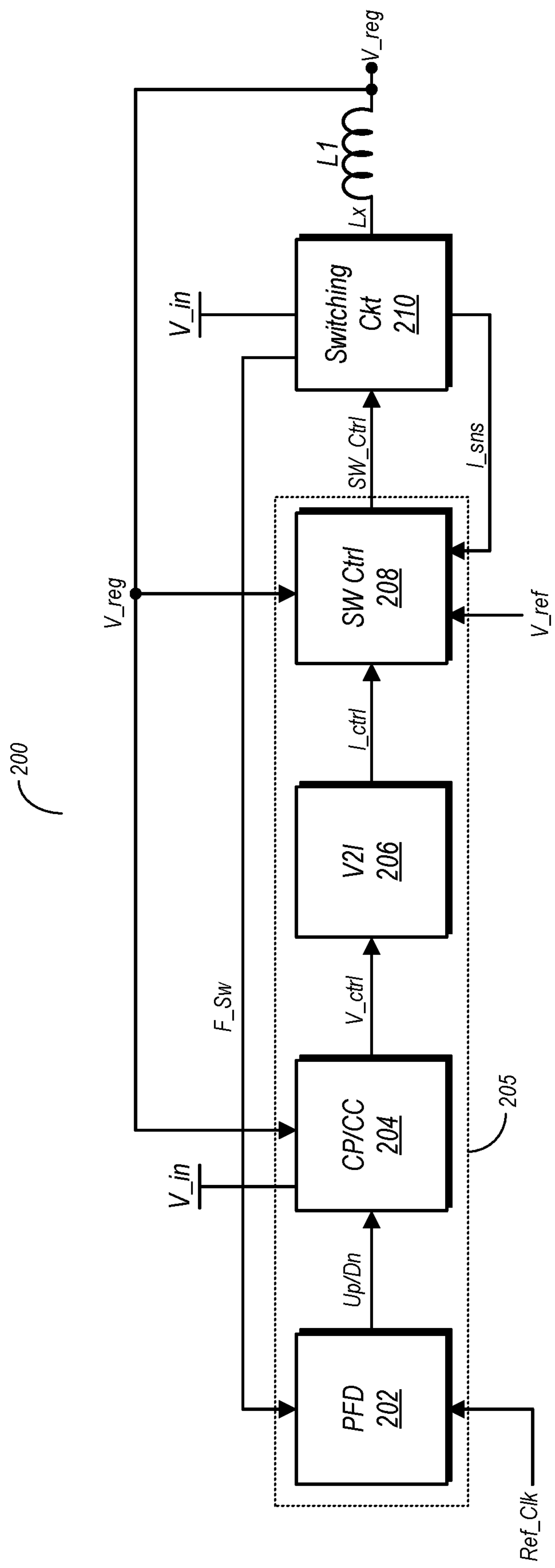
FIG. 2 is a block diagram of one embodiment of a power converter.

FIG. 2 is a block diagram of another embodiment of a power converter according to the disclosure. In the embodiment shown, power converter 200 includes a control circuit 205 and a switching circuit 210. Power converter 200 in the embodiment shown is a PLL-based buck converter, with switching circuit 210 effectively performing the role of a voltage-controlled oscillator (VCO). Control circuit 205 in the embodiment shown includes a phase/frequency detector 202, a charge pump/compensation circuit 204, a transconductance amplifier 206, and a switch control circuit 208. The functions of these circuits are now described in further detail.

Phase/frequency detector 202 in the embodiment shown is configured to compare a reference clock signal to a switching frequency signal received from switching circuit 210. This comparison is configured to yield one of an up (Up) or down signal (Dn) depending on the results of the comparison. The up signal may be generated when the switching frequency is less than the frequency of the reference clock, while the down signal may be generated when the switching frequency is greater than the frequency of the reference clock. Phase/frequency detector 202 may be implemented using any suitable circuitry capable of comparing a phase and/or frequency of two periodic signals.

Charge pump/compensation circuit 204 in the embodiment shown is configured to generate a control voltage, V_ctrl. This circuit may be subdivided into two separate circuits, a charge pump and a compensation circuit. The compensation circuit is coupled to receive the regulated supply voltage, V_reg, and carry out a compensation operation to generate a charge pump current. Using the charge pump current and the Up/Dn signals, charge pump generates the control voltage. By using the compensation circuit, the PLL transfer function of power converter 200 can be made largely independent of both the input voltage, V_in, as well as the output voltage, V_reg, which is the regulated supply voltage. This is due to the generation of a control voltage that is independent of the input and output voltages of power converter 200. It is noted that in some embodiments, the compensation circuit may also receive the input volage, V_in, and carry out compensation based on a voltage V_in-V_reg, rather than on V_reg alone.

The control voltage generated by charge pump/compensation circuit 204 is then used to generate a control current, I_ctrl, by transconductance amplifier 206. Transconductance amplifier may be implemented using any suitable circuitry, such as a common source amplifier or other type of circuit that outputs a current based on an input voltage.

The control current output from transconductance amplifier 206 is then provided to switch control circuit 208. Switch control circuit 208 is coupled to receive the regulated supply voltage, V_reg, a reference voltage, V_ref, and at least one sense current, I_sns, from switching circuit 210. Using V_reg and V_ref, switch control circuit 208 internally generates a demand current signal indicative of the current demanded by a load coupled to power converter 200. Using the demand current signal and at least one sense current, switch control circuit 208 generates switch control signals, SW_Ctrl, which are used to control the switching of devices in switching circuit 210.

Switching circuit 210 in the embodiment shown is configured to receive an input voltage, V_in, and generate the output voltage, V_reg based thereon. Since the embodiment discussed here is a buck converter, V_in >V_reg. It is noted however, that the disclosure is not intended to be limited to a buck converter, as boost converter embodiments are also possible and contemplated. Although not explicitly shown in FIG. 2, switching circuit 210 includes a high side switch coupled between the switching node, Lx, and V_in, and further includes a low side switch coupled between Lx and ground. The high side and low side switches may be implemented using PMOS and NMOS devices, respectively, although this is not limiting with regard to the disclosure (e.g., a bootstrapped NMOS device may be used for the high side device in another embodiment). These devices may alternately switch on and off, and thus alternately source and sink current to and from inductor L1 in order to generate the regulated supply voltage.

Figure 3:
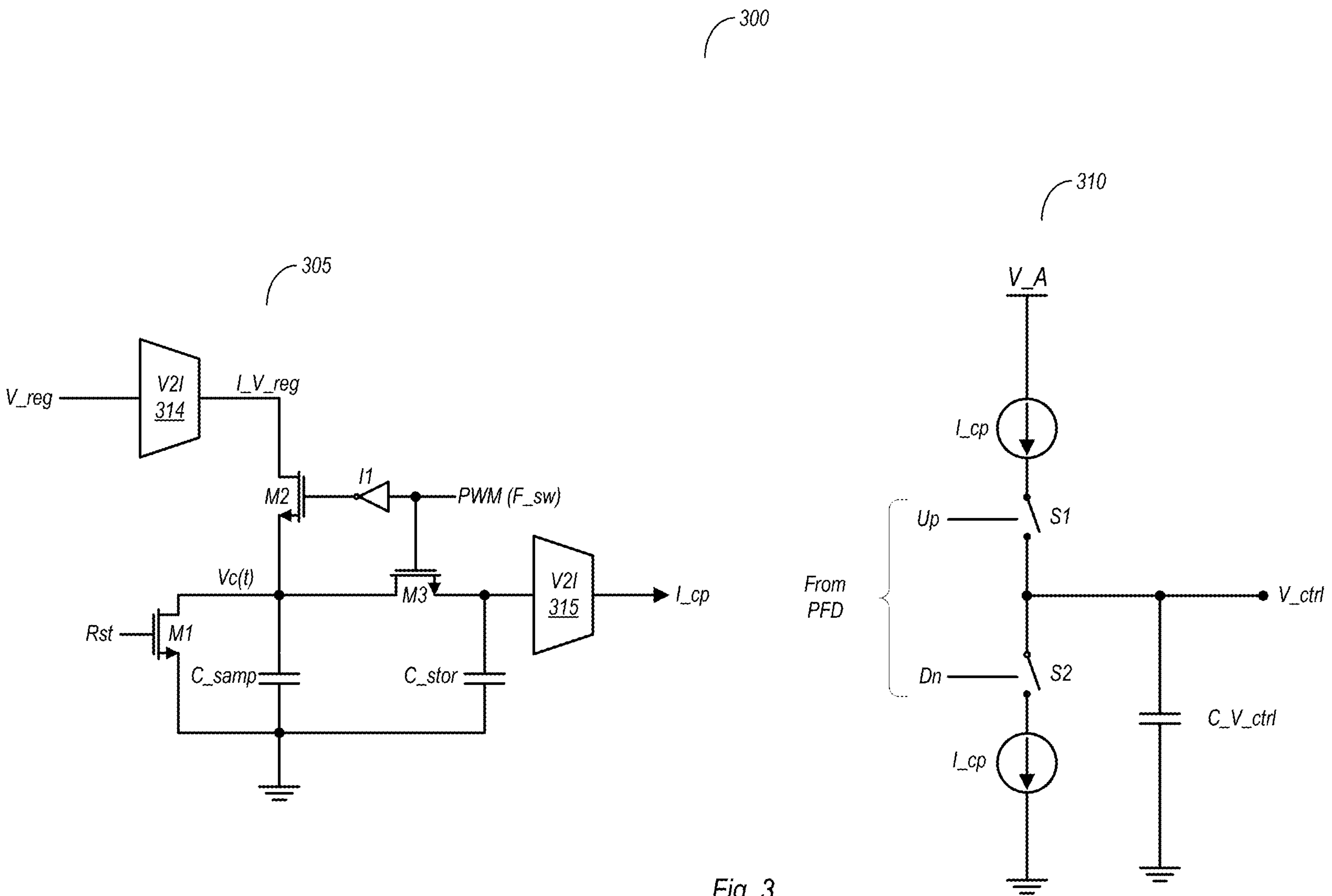
FIG. 3 is a schematic diagram of one embodiment of a charge pump and a compensation circuit used to generate a charge pump current.

Charge Pump with Compensation Circuit:

FIG. 3 is a schematic diagram illustrating one embodiment of a compensation circuit used with a charge pump. In the embodiment shown, compensation circuits 305 is configured to generate a charge pump current, I_cp, which is provided to charge pump 310. More particularly, compensation circuit 305 may source or sink current to charge pump 310 in order to control the value of the control voltage, V_ctrl.

Compensation circuit 305 in the embodiment shown is coupled to receive the regulated supply voltage, V_reg, a PWM signal (corresponding to the switching signal, at the switching frequency F_sw, of the switching circuit) and a reset signal, Rst. During a first portion of a switching cycle, when the PWM signal is low, the output of inverter I1 is high, thereby activating M2. The regulated supply voltage, V_reg, is received by transconductance amplifier 314, which is an amplifier having a voltage input and a current output (and can be implemented by any suitable circuitry capable of the same). The output of transconductance amplifier 314 is the current I_V_reg, which passes through M2, when active. This current is used to charge the sampling capacitor, C_samp. This allows the generation of a sampled voltage, Vc(t).

When PWM transitions form low to high, the output of inverter I1 falls low, thereby deactivating M2. However, M3 is activated in response to the high transition of PWM, which thereby effectively places the storage capacitor, C_stor, in parallel with the sampling capacitor, C_samp. Accordingly, the sampled voltage is transferred to C_stor. Additionally, the ungrounded terminal of C_stor is coupled to the input of another transconductance amplifier 315. This transconductance amplifier may also be implemented using any suitable amplifier configuration that receives a voltage as an input and outputs a current value. In compensation circuit 305, the sampled voltage that is stored on storage capacitor C_stor is received by transconductance amplifier 315 and used to generate the charge pump current, I_cp.

At the end of the switching cycle, when PWM falls low again, a reset signal may be briefly asserted on the gate terminal of M. The reset signal may be generated by any suitable circuitry that response to the high-to-low transition of PWM. When M1 is activated, any voltage on the sampling capacitor, C_samp, may be discharged. Thereafter, the sampling capacitor may again begin charging in response to the activation of M2. Additionally, the high-to-low transition of PWM deactivates M3, thereby isolating the storage capacitor C_stor, from the sampling capacitor C_samp. This allows the previously sampled voltage to be maintained across C_stor.

Charge pump 310 in the embodiment shown includes a first switch S1 and a second switch S2, along with a capacitor, C_V_ctrl, across with the control voltage is generated. Switch S1 is coupled to receive an up, Up, signal from the phase/frequency detector, while switch S2 is coupled to receive a down signal, Dn, from the phase/frequency detector. Since only one of these signals is asserted at a given time, only one of switches S1 or S2 is closed at a time. If the Up signal is received, switch S1 is closed, and the charge pump current I_cp is sourced to capacitor C_V_ctrl. This results in charging of the capacitor, thereby increasing the control voltage. If the Dn signal is received, the charge pump current I_cp is sunk from capacitor C_V_ctrl, thereby discharging the capacitor and reducing the control voltage V_ctrl. This control voltage forms a basis for controlling the switching frequency of the switching circuit that is downstream from charge pump 310. Since the charge pump current is dependent in part on the duty cycle, the increase or decrease in the control voltage may also depend on the duty cycle.

By factoring in variations in the regulated supply voltage using compensation circuit 305, the transfer function of the PLL-based power converter can be made substantially independent of variations of the output and input voltages relative to embodiments in which the charge pump generates a control voltage based only on the results of the phase/frequency comparison. The compensation circuit allows stability of the PLL to be obtained independent of the switching duty cycle, and further allows the stability to be adjusted on a cycle-by-cycle basis (since the regulated output voltage is sampled each switching cycle).

Figure 4:
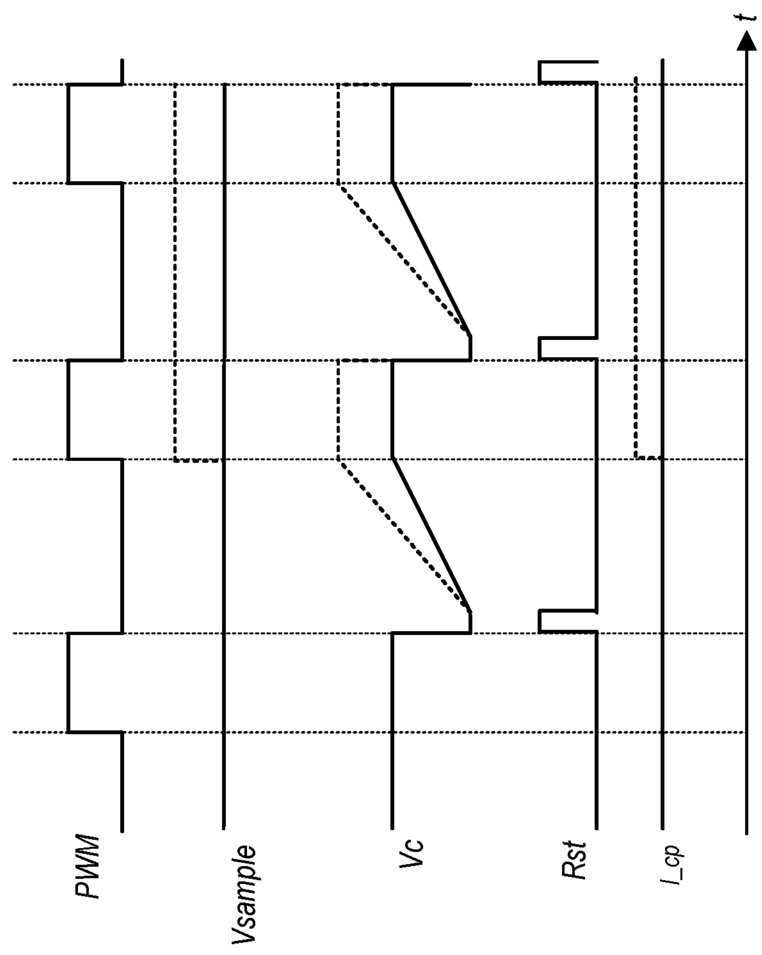
FIG. 4 is a timing diagram illustrating operation of one embodiment of a compensation circuit used to generate a charge pump current.

FIG. 4 is a timing diagram that further illustrates operation of the compensation circuit. It is noted that the diagram is not intended to be to scale, but rather to be illustrative of the general operation of the compensation circuit 305 as shown in FIG. 3.

When the PWM signal falls, the reset signal is asserted for a brief time that PWM is low. This discharges the sampling capacitor, and brings the sampling voltage Vc down to a reset level. Thereafter, the sampling capacitor begins charging and Vc rises. Since the amount of current used to generate Vc is dependent on the regulated supply voltage, the rise in Vc is also dependent on the regulated supply voltage. As indicated by the dashed lines in the diagram, Vc may rise faster and to a higher level for a higher value of the regulated supply voltage.

When PWM transitions high, the charging is discontinued (due to the deactivation of M2. Furthermore, the value of Vc is transferred to the storage capacitor, C_stor. Since higher values of the regulated supply voltage can charge Vc to a higher value, the sampled voltage, Vsample, transferred to the storage capacitor, V_stor, can also increase as shown by dashed lines. Similarly, a corresponding increase may be seen in the charge pump current, I_cp.

At the end of the switching cycle, the PWM signal falls low again, thereby providing another assertion of the reset signal and thus discharging the sampling capacitor and thereby restarting the sample-and-transfer cycle of the circuit. Thus, the regulated supply voltage is sampled once every switching cycle, thereby allowing adjustment of the PLL stability on a cycle-by-cycle basis.

Figure 5:
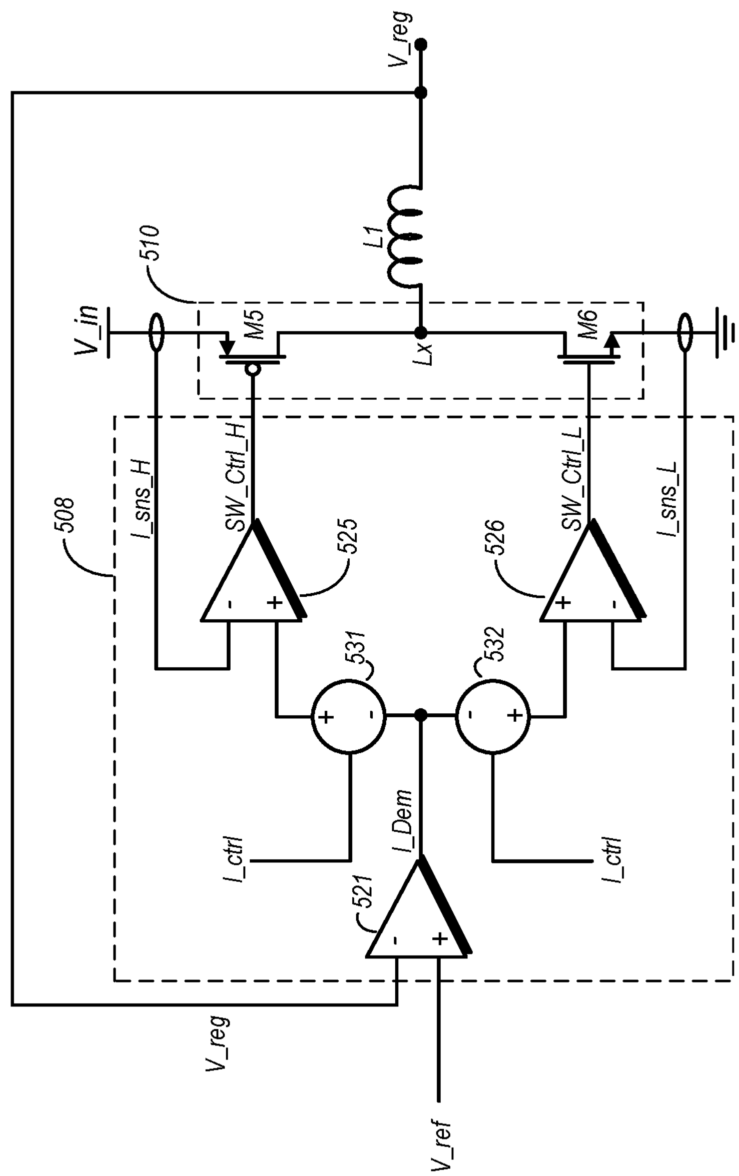
FIG. 5 is a schematic diagram of a switching circuit and a circuit used to generate a demand current.

Switching Control Circuit and Switching Circuit:

FIG. 5 is a schematic diagram illustrating one embodiment of a switching control circuit and a switching circuit. In the embodiment shown, switching control circuit 508 is configured to generate control signals SW_Ctrl_H and SW_Ctrl_L to control the high side and low side switches, M5 and M6, respectively.

Switch control circuit 508 is coupled to receive the control current, I_ctrl, that is generated based on the control voltage and output from a transconductance amplifier as discussed above. The control voltages may control voltage sources 531 and 532, which are coupled to non-inverting inputs of comparators 525 and 526, respectively. Amplifier 521 in the embodiment shown is coupled to receive the regulated supply voltage, V_reg, and a reference voltage, V_ref. Based on the relative levels of these voltages, amplifier 521 generates a signal I_Dem, that is indicative of the demand current by a load coupled to receive the regulated supply voltage. This value, combine with the voltages generated by voltage sources 531 and 532 control the signal levels provided to the non-inverting inputs of comparators 525 and 526, respectively.

Comparator 525 in the embodiment shown is configured to receive a first signal, I_sns_H, on its inverting input, the signal being indicative of a sensed current through the source terminal of M5. Similarly, the signal I_sns_L is received on the inverting input of comparator 526, with I_sns_L being indicative of the current through the source terminal of M6. Using their respective input signals, comparators 525 and 526 may trigger their respective control signals to operate switches M5 and M6. The arrangement of switch control circuit 508 is such that only one of M5 or M6 is active at a given time. When M5 is active, current is sourced to inductor L1 via the switching node Lx. When M6 is active, current is sunk from inductor L1 via switching node Lx.

Figure 6:
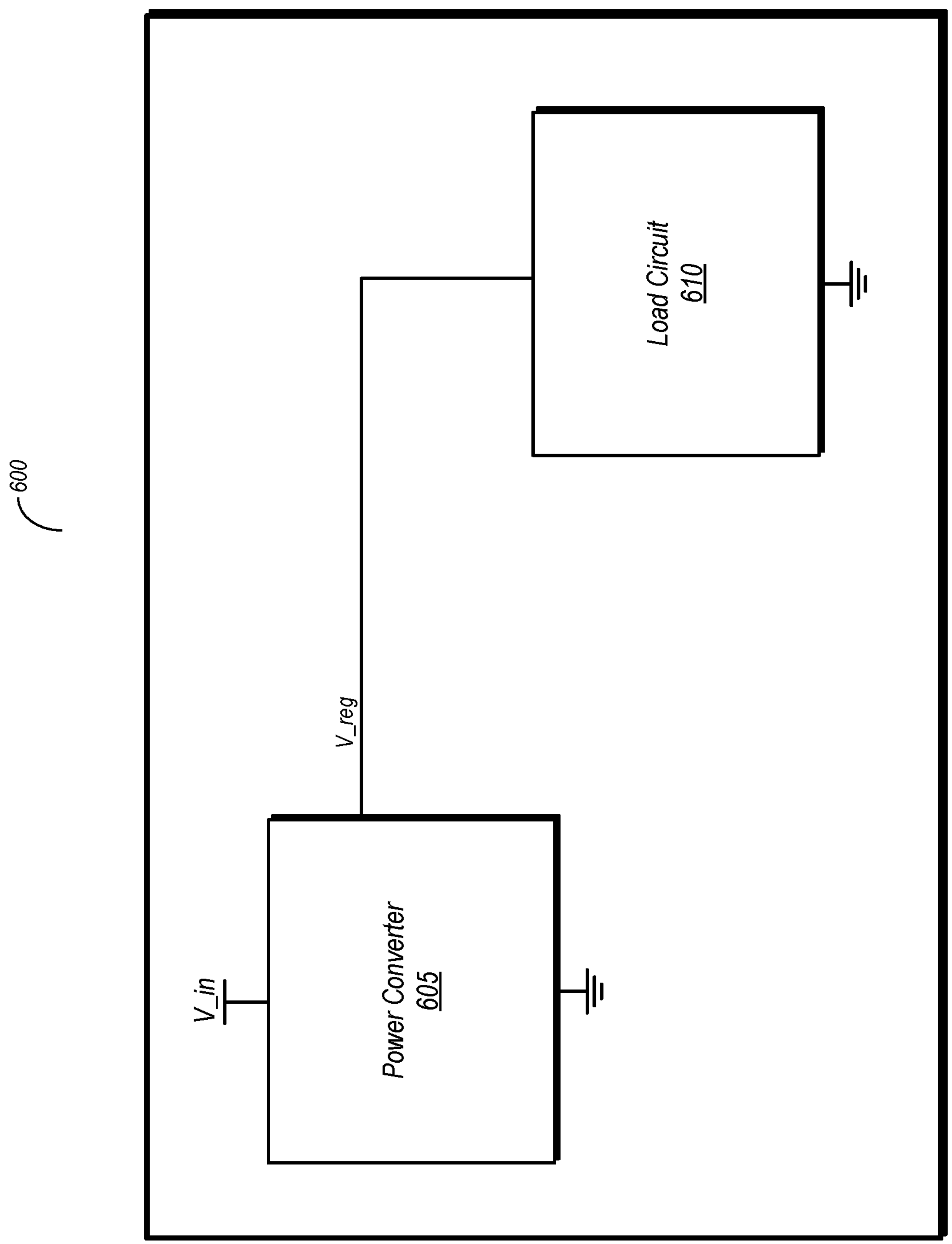
FIG. 6 is a block diagram of one embodiment of a power converter coupled to a load circuit.

Integrated Circuit with Power Converter:

FIG. 6 is a block diagram of one embodiment of an integrated circuit (IC). In the embodiment shown, IC 600 includes a power converter 605 and a load circuit 610. Power converter 605 is coupled to receive an input voltage, V_in, which may be provided by a source external to IC 600 or from another on-chip source. In this embodiment, power converter 605 is a PLL-based switching power converter in accordance with the discussion above. The output of power converter 605 is a regulated supply voltage, V_reg, which is received by load circuit 610. Load circuit 610 may be virtually any type of circuitry that can be implemented on an IC, including analog, digital, and/or mixed signal circuitry.

Method Embodiments

Figure 7:
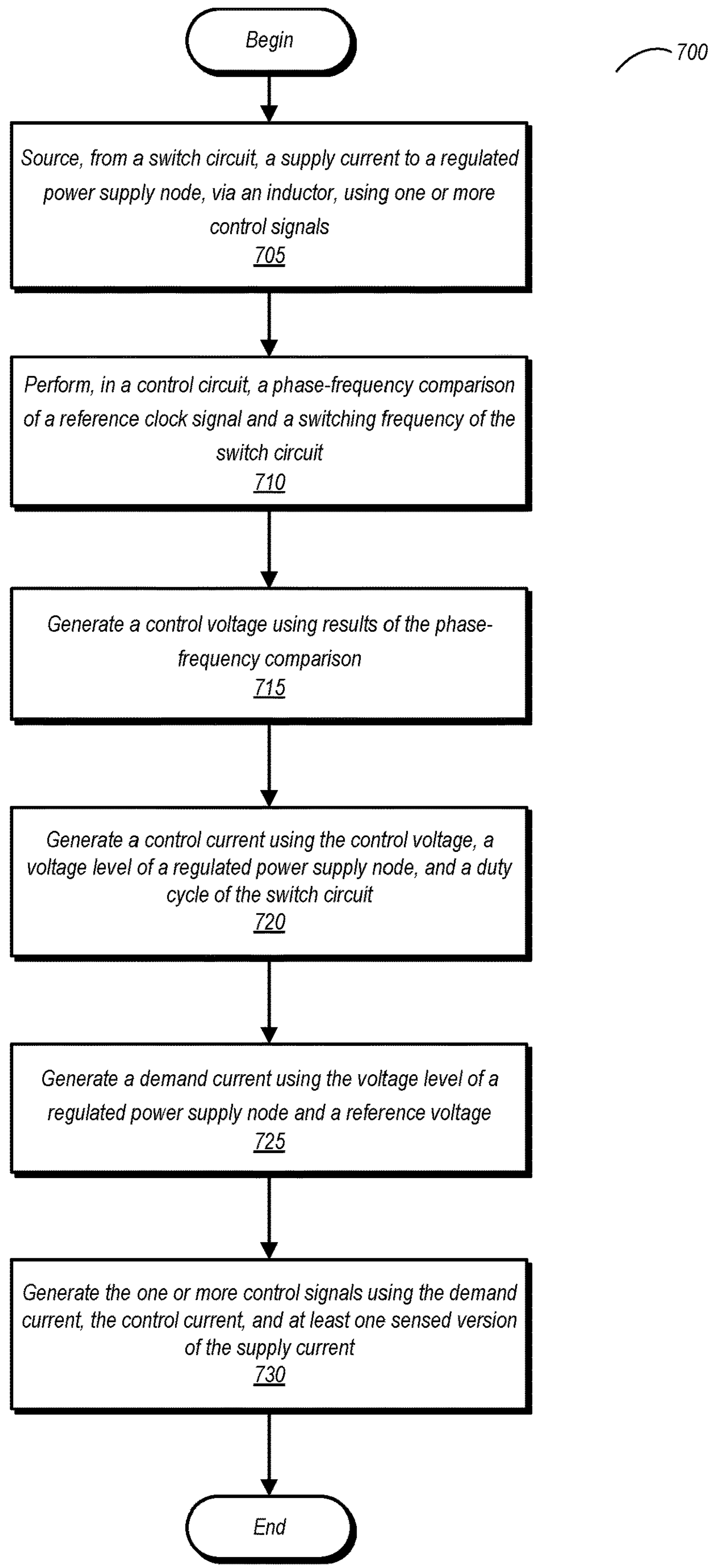
FIG. 7 is a flow diagram illustrating one embodiment of a method for operating a power converter.

FIG. 7 is a flow diagram of one embodiment of a method for operating a power converter. Method 700 may be carried out by any embodiment of a power converter discussed above. Embodiments of a power converter capable of carrying out Method 700 but not explicitly disclosed herein also fall within the scope of this disclosure.

Method 700 begins with sourcing, from a switch circuit, a supply current to a regulated power supply node, via an inductor, using one or more control signals (block 705). The method further includes performing, in a control circuit, a phase-frequency comparison of a reference clock signal and a switching frequency of the switch circuit (block 710) and generating a control voltage using results of the phase-frequency comparison (block 715). Thereafter the method includes generating a control current using the control voltage, a voltage level of a regulated power supply node, and a duty cycle of the switch circuit (block 720). Method 700 further includes generating a demand current using the voltage level of a regulated power supply node and a reference voltage (block 725) and generating the one or more control signals using the demand current, the control current, and at least one sensed version of the supply current (block 730).

In various embodiments, the generating the control voltage includes generating, in a sampling circuit, a sampling voltage across a first capacitor based on the voltage level of the regulated supply voltage node during a first portion of a switching cycle and transferring the sampling voltage to a second capacitor during a second portion of the switching cycle. Such embodiments further include generating, a charge pump current by providing the sampling voltage from the second capacitor to an input of a transconductance amplifier. The control voltage is generated a charge pump using the charge pump current and one or more signals generated in response to the phase-frequency comparison of a reference clock signal and a switching frequency of the switch circuit.

In some embodiments of Method 700, generating the demand current comprises comparing, in a comparator, a reference voltage the voltage level of the regulated power supply node. Embodiments are also possible and contemplated that include a transconductance amplifier receiving the control voltage and generating the control current based on the control voltage Generating the one or more control signals includes generating a first control signal to control a high side switch, wherein generating the first control signal comprises comparing a first sense current to a sum of the control current and the demand current. Generating the one or more control signals includes also includes generating a second control signal to control a low side switch, wherein generating the second control signal, comprises comparing a second sense current to the sum of the control current and the demand current.

Figure 8:
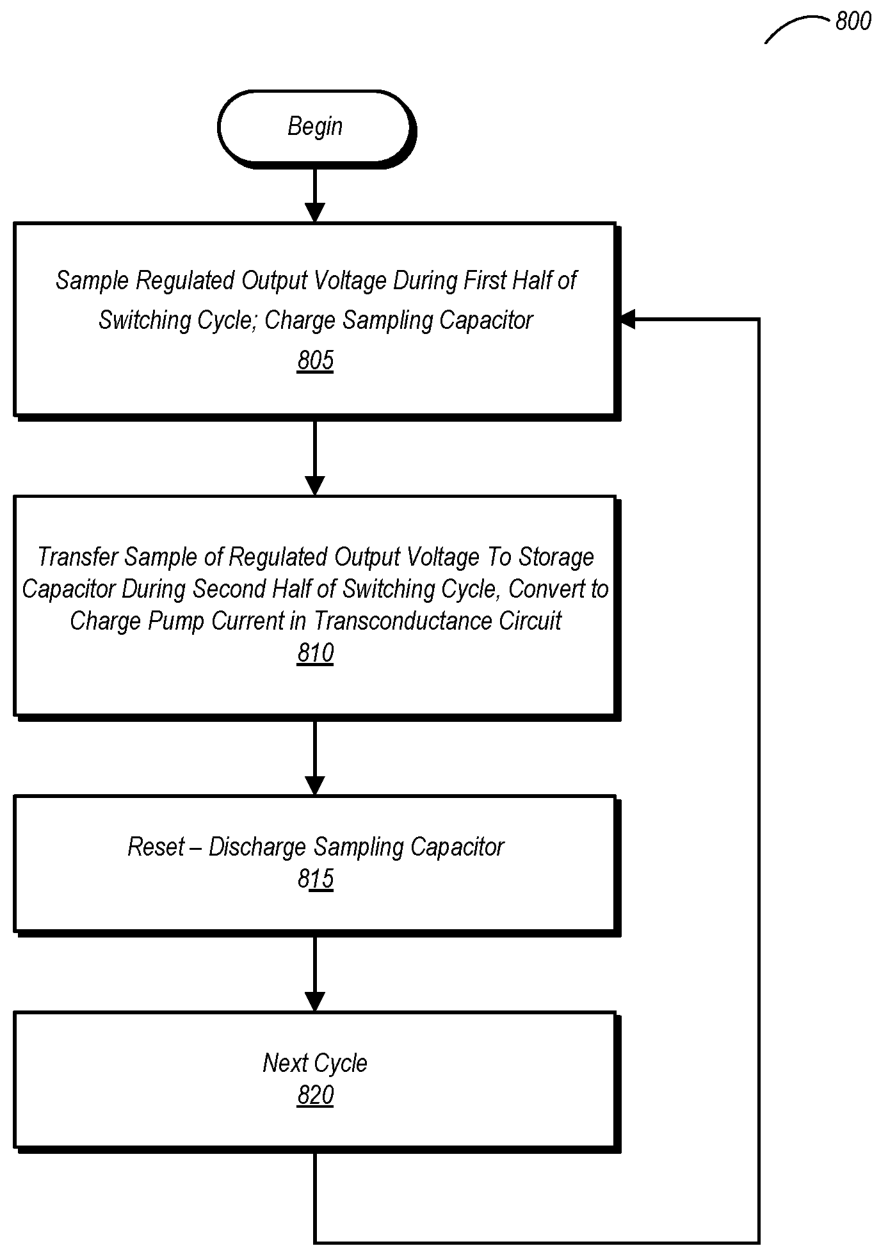
FIG. 8 is a flow diagram illustrating one embodiment of operating a compensation circuit in a power converter.

FIG. 8 is a flow diagram of an embodiment of method for operating a compensation circuit in a power converter. Method 800 may be carried out by various embodiments of a compensation circuit, such as that illustrated in FIG. 3. Embodiments of a compensation circuit not explicitly discussed herein but otherwise capable of carrying out Method 800 are also considered to fall within the scope of this disclosure.

Method 800 includes sampling a regulated supply voltage during a first half of a switching cycle and charging a sampling capacitor (block 805). This may include receiving the regulated supply voltage on the input of a transconductance amplifier, which outputs a current corresponding to the regulated supply voltage. This current is then used to charge the sampling capacitor, with the voltage across the capacitor corresponding to a sample of the regulated supply voltage. The method further includes transferring the sample of the regulated supply voltage to a storage capacitor during a second half of a switching cycle and converting the voltage to the charge pump circuit using another transconductance amplifier (block 810). After completion of the second half of the switching cycle, the method includes discharging the sampling capacitor (block 815) and progressing to the next cycle (block 820) by returning to block 805.

Example System

Figure 9:
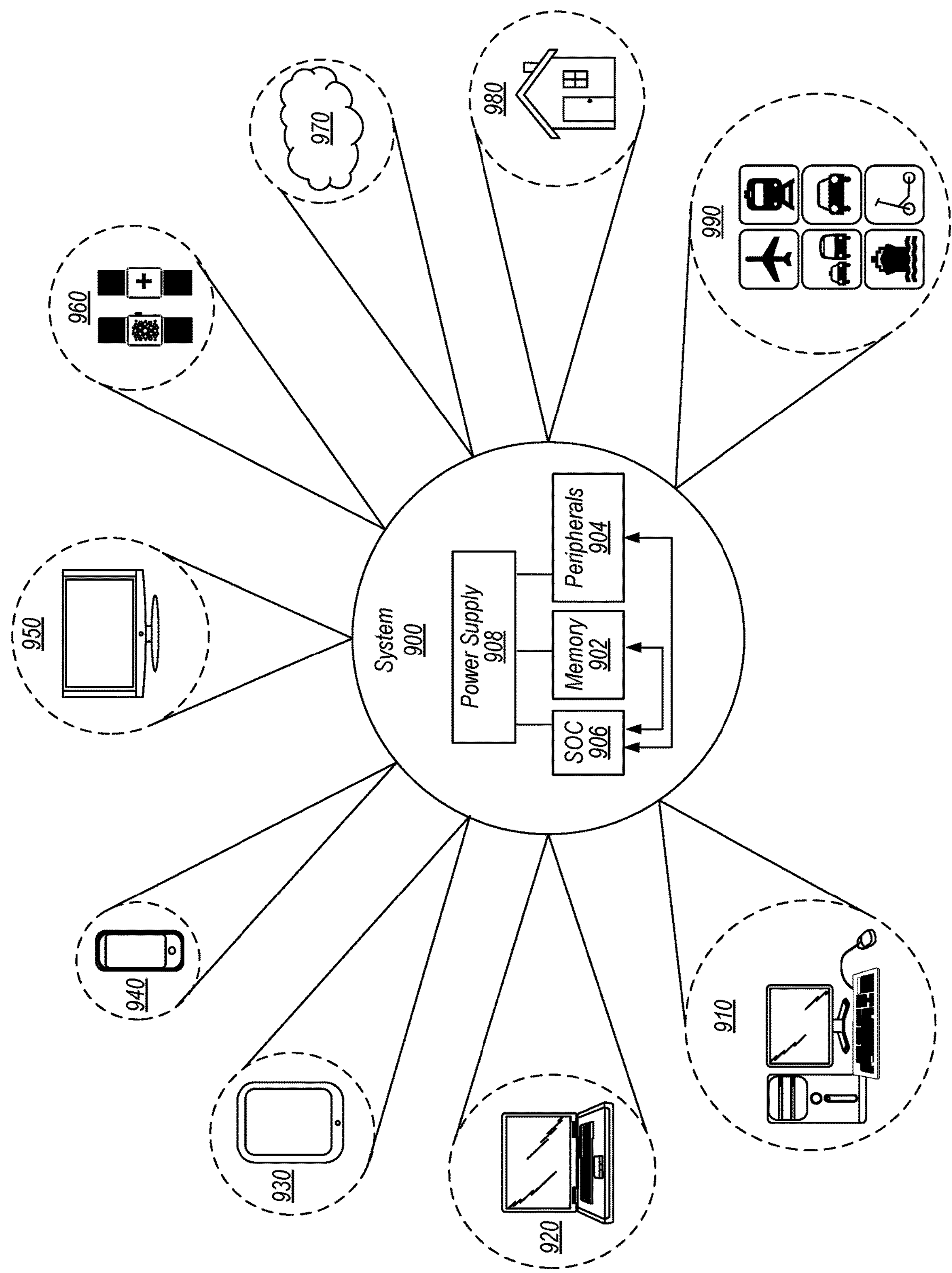
FIG. 9 is a block diagram of one embodiment of an example system.

Turning next to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing units, such as a central processing unit (CPU), a graphics processing unit (GPU), or otherwise, a communication fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

ICs in various ones of the components of system 900 may include one or more power converters in accordance with the discussion above. Such power converters can be used to provide a regulated supply voltage to various load circuits.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch 960 may include a variety of general-purpose computing related functions. For example, smartwatch 960 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types.

Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation

[entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a switch circuit including a switch node coupled to a regulated power supply node via an inductor, wherein the switch circuit is configured to source a supply current to the regulated power supply node using one or more control signals; and
a control circuit configured to:
perform a phase-frequency comparison of a reference clock signal and a switching frequency of the switch circuit;
generate a control voltage using results of the phase-frequency comparison;
generate a control current using the control voltage, a voltage level of the regulated power supply node, and a duty cycle of the switch circuit;
generate a demand current using the voltage level of the regulated power supply node and a reference voltage; and
generate the one or more control signals using the demand current, the control current, and a sensed version of the supply current, wherein the control circuit includes a charge pump and the charge pump includes a sampling circuit configured to sample the voltage level of the regulated power supply node in accordance with the switching frequency of the switch circuit.

2. The apparatus of claim 1, wherein the sampling circuit is configured to:
generate a sampling voltage across a first capacitor based on the voltage level of the regulated power supply node during a first portion of a switching cycle;
transfer the sampling voltage to a second capacitor during a second portion of the switching cycle; and
provide the sampling voltage from the second capacitor to a transconductance amplifier to generate a charge pump current.

3. The apparatus of claim 2, wherein the sampling circuit is further configured to discharge the sampling voltage from the first capacitor at an end of the switching cycle.

4. The apparatus of claim 1, further comprising a phase-frequency detector configured to generate either a first signal or a second signal depending on results of the phase-frequency comparison, wherein the charge pump is configured to generate the control voltage using the first signal or the second signal and a charge pump current.

5. The apparatus of claim 1, further comprising a transconductance amplifier configured to convert the control voltage into the control current.

6. The apparatus of claim 1, further comprising a comparator configured to generate the demand current based on a comparison of the voltage level of the regulated power supply node and the reference voltage.

7. The apparatus of claim 1, further comprising:
a first comparator configured to control a high side switch of the switch circuit based on a comparison of a first sense current from the high side switch to a sum of the demand current and the control current, wherein the high side switch is coupled between an input voltage node and the switch node; and
a second comparator configured to control a low side switch of the switch circuit based on a comparison of a second sense current from the low side switch and the sum of the demand current and the control current, wherein the low side switch is coupled between a ground node and the switch node.

8. The apparatus of claim 1, wherein a transfer function of the control circuit is independent of a variation in the voltage level of the regulated power supply node.

9. A method comprising:
sourcing, from a switch circuit, a supply current to a regulated power supply node, via an inductor, using one or more control signals;
performing, in a control circuit, a phase-frequency comparison of a reference clock signal and a switching frequency of the switch circuit;
generating a control voltage using results of the phase-frequency comparison, wherein generating the control voltage includes sampling, in a sampling circuit of a charge pump, a voltage level of the regulated power supply node in accordance with the switching frequency of the switch circuit;
generating a control current using the control voltage, the voltage level of the regulated power supply node, and a duty cycle of the switch circuit;
generating a demand current using the voltage level of the regulated power supply node and a reference voltage; and
generating the one or more control signals using the demand current, the control current, and at least one sensed version of the supply current.

10. The method of claim 9, wherein generating the control voltage further includes:
generating, in a sampling circuit, a sampling voltage across a first capacitor based on the voltage level of the regulated power supply node during a first portion of a switching cycle;
transferring the sampling voltage to a second capacitor during a second portion of the switching cycle;
generating a charge pump current by providing the sampling voltage from the second capacitor to an input of a transconductance amplifier; and
generating the control voltage in the charge pump using the charge pump current and one or more signals generated in response to the phase-frequency comparison of the reference clock signal and the switching frequency of the switch circuit.

11. The method of claim 9, wherein generating the demand current comprises comparing, in a comparator, the reference voltage and the voltage level of the regulated power supply node.

12. The method of claim 9, wherein generating the one or more control signals includes:
generating a first control signal to control a high side switch, wherein generating the first control signal comprises comparing a first sense current to a sum of the control current and the demand current; and
generating a second control signal to control a low side switch, wherein generating the second control signal, comprises comparing a second sense current to the sum of the control current and the demand current.

13. The method of claim 9, further comprising a transconductance amplifier receiving the control voltage and generating the control current based on the control voltage.

14. An apparatus, comprising:
a load circuit; and a power converter circuit coupled to the load circuit and configured to provide a regulated supply voltage to the load circuit, wherein the power converter circuit comprises:

a switch circuit including a switch node coupled to a regulated power supply node via an inductor, wherein the switch circuit is configured to source a supply current to the regulated power supply node using one or more control signals; and a control circuit configured to:

perform a phase-frequency comparison of a reference clock signal and a switching frequency of the switch circuit;

generate a control voltage using results of the phase-frequency comparison;

generate a control current using the control voltage, a voltage level of the regulated power supply node, and a duty cycle of the switch circuit;

generate a demand current using the voltage level of the regulated power supply node and a reference voltage; and generate the one or more control signals using the demand current, the control current, and a sensed version of the supply current, wherein the control circuit includes a charge pump and the charge pump includes a sampling circuit configured to sample the voltage level of the regulated power supply node in accordance with the switching frequency of the switch circuit.

15. The apparatus of claim 14, wherein the load circuit includes a system-on-a-chip (SOC), a memory coupled to the SOC, and a peripheral device coupled to the SOC and to the memory.

16. The apparatus of claim 14, wherein the charge pump is configured to generate the control voltage using a charge pump current and the voltage level of the regulated power supply node.

17. The apparatus of claim 14, further comprising a comparator configured to generate the demand current based on a comparison of the voltage level of the regulated power supply node and the reference voltage.

18. The apparatus of claim 14, further comprising:

a first comparator configured to control a high side switch of the switch circuit based on a comparison of a first sense current from the high side switch to a sum of the demand current and the control current, wherein the high side switch is coupled between an input voltage node and the switch node; and a second comparator configured to control a low side switch of the switch circuit based on a comparison of a second sense current from the low side switch and the sum of the demand current and the control current, wherein the low side switch is coupled between a ground node and the switch node.

* * * * *